United States Patent [19]

Usami et al.

[11] Patent Number: 4,477,150
[45] Date of Patent: * Oct. 16, 1984

[54] ELECTRIC REMOTE CONTROL REARVIEW MIRROR

[75] Inventors: Susumu Usami, Nagoya; Nobuyuki Teranishi, Mie; Tomohisa Kuwako, Anjo; Ikuo Sugiyama, Gifu; Yoshio Tsujiuchi, Kuwana; Shigeo Hara, Inuyama, all of Japan

[73] Assignee: Kabushiki Kaisha Tokai Rika Denki Seisakusho, Nishi, Japan

[*] Notice: The portion of the term of this patent subsequent to Dec. 7, 1999 has been disclaimed.

[21] Appl. No.: 381,006

[22] Filed: May 21, 1982

Related U.S. Application Data

[63] Continuation-in-part of Ser. No. 192,599, Sep. 30, 1980, Pat. No. 4,362,362.

[30] Foreign Application Priority Data

Oct. 17, 1979 [JP] Japan .................. 54-144090[U]
Oct. 19, 1979 [JP] Japan .................. 54-145052[U]

[51] Int. Cl.³ .............................................. G02B 7/18
[52] U.S. Cl. ................................................... 350/289
[58] Field of Search ............... 350/289; 411/512, 907, 411/908

[56] References Cited

U.S. PATENT DOCUMENTS

3,609,014 9/1971 Kurz, Jr. ........................... 350/289
4,202,603 5/1980 Miyauchi .......................... 350/289
4,362,362 12/1982 Usami et al. ..................... 350/289

FOREIGN PATENT DOCUMENTS

2502188 7/1976 Fed. Rep. of Germany .
2730165 2/1978 Fed. Rep. of Germany .
7827935 9/1978 Fed. Rep. of Germany .

OTHER PUBLICATIONS

G.R.C.-Catalog #2002-D-Die Cast Industrial Fasteners and Molded Nylon Fasteners, pp. 1, 2 and 7.

Primary Examiner—F. L. Evans
Attorney, Agent, or Firm—Wenderoth, Lind & Ponack

[57] ABSTRACT

An electric remote-controlled rearview mirror assembly for a vehicle includes a mirror pivotally supported by a three point pivot connection of which the center pivot connection is stationary to permit angular movement of the mirror therearound. The remaining two pivot connections are spaced a predetermined angle from each other about the center pivot connection and are connected to rod members which are individually actuatable for longitudinal movement by at least one electric reversible motor to thereby positively angularly adjust the mirror around the center pivot connection. The drive of the motor is transmitted to the rod members through nut members. The rod members is made of an elastic material with providing threads whereas the nut members is made of a rigid material with providing teeth to be meshed with the threads of the rod members.

10 Claims, 21 Drawing Figures

ELECTRIC REMOTE CONTROL REARVIEW MIRROR

This application is a continuation-in-part application of U.S. patent application Ser. No. 192,599 of the same applicant filed on Sept. 30, 1980, now U.S. Pat. No. 4,362,362.

BACKGROUND OF THE INVENTION

The present invention relates to an electric remote control rearview mirror assembly particularly suited for use in an automobile vehicle.

U.S. Pat. No. 3,609,014, patented on Sept. 28, 1971, discloses an electric remote control rearview mirror assembly for an automobile. This rearview mirror assembly comprises a mirror having a reflective surface and a backside and supported by a mirror support plate with the backside facing the support plate; a spherical mounting member upon which the support plate carrying the mirror is clamped for pivotal movement around horizontal and vertical axes; a support member carrying the spherical mounting member; a pair of ball sockets provided in the support plate in spaced relation to the spherical mounting member and spaced 90° from each other with respect to the spherical mounting member; a pair of externally threaded rods projecting from the support plate, each of the rods having one end pivotally secured in one of the ball sockets against rotational and axial displacement relative to the support plate; a pair of externally threaded nut members rotatably supported by the support member, each of the nut members engaging one of the externally threaded rods; and electric drive means for selectively rotating the nut members to pivotally adjust the support plate about the spherical mounting member to angularly adjust the position of the mirror with respect to the horizontal and vertical axes.

The drive means is described as comprised of either a single electric reversible motor having its drive shaft adapted to be selectively shiftable into and out of driving engagement with either of the nut members by the utilization of a solenoid unit, or two separate electric reversible motors having their drive shafts drivingly engaged to the associated nut members.

Each of the nut members is described as having either an internally threaded bore or an internally smooth bore. Where the nut members have respective internally threaded bores, they are threadingly mounted on the associated rods. However, where the nut members have respective smooth bores, a generally U-shaped spring element is employed for each nut member, one of the opposed arm portions of the U-shaped spring element extending across the smooth bore and passing through a groove between every adjacent two convolutions of the respective external threads on the rod.

In the prior art mirror assembly of the construction described above, it has been found that the manufacture thereof is generally complicated and time-consuming. More specifically, it has often been required, particularly prior to the mirror assembly being packaged for shipment, to effect a manual adjustment of the mirror relative to a mirror box so that the mirrors of the individual remote control rearview mirrors being manufactured can assume substantially the same position relative to the associated mirror boxes. However, the prior art mirror assembly referred to above requires the supply of an electric power to the motor or motors in order to achieve the adjustment of the mirror box relative to the mirror to finish the make-up of the remote control rearview mirror assembly. This involves such a disadvantage that, each time the mirror assemblies being manufactured are successively delivered into the hands of an attendant worker or workers assigned to effect the adjustment of the mirror relative to the mirror box, they have to connect and disconnect the motor or motors to an electric circuit including the electric power source.

However, where the prior art remote control rearview mirror assembly utilizes the generally U-shaped spring elements in conjunction with the nut members having smooth bores, the manual adjustment of the mirror relative to the mirror box may be possible by applying an external pushing force to the mirror so that the individual externally threaded rods can be moved axially permitting one of the opposed arm portions of the U-shaped spring elements to hop from one groove to another under the influence of resiliency of the spring elements. In this case, not only is a relatively large external pushing force required, but also the hopping of that arm portion of the spring elements from one groove to another generates vibrations and noises, and, accordingly, the attendant worker or workers are placed in working conditions uncomfortable to them.

SUMMARY OF THE INVENTION

Accordingly, the present invention has been developed with a view to substantially eliminate the disadvantages and inconveniences inherent in the prior art remote control rearview mirror assembly and has for its essential object to provide an improved remote control rearview mirror assembly for an automotive vehicle which can readily be manufactured and is inexpensive due to the fact that the complicated and time-consuming procedure of adjusting the mirror relative to the mirror box has been obviated.

Another important object of the present invention is to provide an improved remote control rearview mirror assembly of the type referred to above, wherein the manual adjustment of the mirror relative to the mirror box can readily be carried out by applying a relatively small external pushing force to the mirror.

A further object of the present invention is to provide an improved remote control rearview mirror assembly of the type referred to above, with which one can effect the manual adjustment of the mirror relative to the mirror box with no substantial difficulty in the event that breakdown occurs in an electric circuit system between the electric power source and the motor or motors.

According to the present invention, the above described objects can readily be accomplished by providing an improved remote control rearview mirror assembly wherein one of the rod members and the nut members is made of a rigid material, such as a metal or a hard synthetic resin, and the other of the rod members and the nut members is made of an elastic synthetic resin such as synthetic rubber. In addition, if each of the rod members is made of an elastic synthetic resin, the respective rod member has a substantially smooth peripheral surface instead of being provided with external threads and extends through the corresponding nut member having an internally threaded bore, the internal threads of the corresponding nut member being then elastically threadingly engaged on the substantially smooth peripheral surface of the respective rod member. In this case, each rod member must have a diameter sufficient to allow the internal threads of the corresponding nut member to elastically encroach upon the substantially smooth surface of the respective rod member.

On the other hand, if each of the rod members is made of a rigid material, the respective rod has external threads on the peripheral surface thereof and extends through the corresponding nut member having a substantially smooth bore instead of being provided with internal threads, the external threads of the respective rod member being then elastically threadingly engaged on the substantially smooth inner surface of the corresponding nut member. In this case, each nut member must have an inner diameter sufficient to allow the external threads of the respective rod member to elastically encroach upon the substantially smooth inner peripheral surface of the respective nut member.

Moreover, according to the present invention, instead of the use of the nut members, the employment of at least one cylindrical drive element is possible, this drive element being operatively engaged on the corresponding rod member to move the latter in an axial direction during rotation of the drive element.

In any event, in the present invention, because either the rod members or the nut members or the drive element is made of the elastic material while the other is made of the rigid material, the position of each rod member relative to the corresponding nut member or drive element can readily be adjusted merely by applying an external pushing force of a magnitude smaller than that required in the prior art rearview mirror assembly.

BRIEF DESCRIPTION OF THE DRAWINGS

These and other objects and features of the present invention will become apparent from the following description of preferred embodiments thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 1:
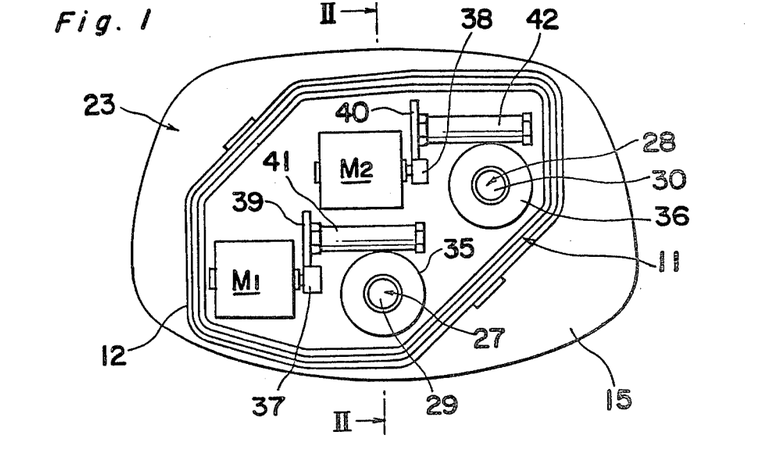
FIG. 1 is a rear elevational view of a remote control rearview mirror assembly according to one preferred embodiment of the present invention as viewed in a direction opposite to the reflective surface of the mirror and with an inner casing and a mirror box removed.
Figure 2:
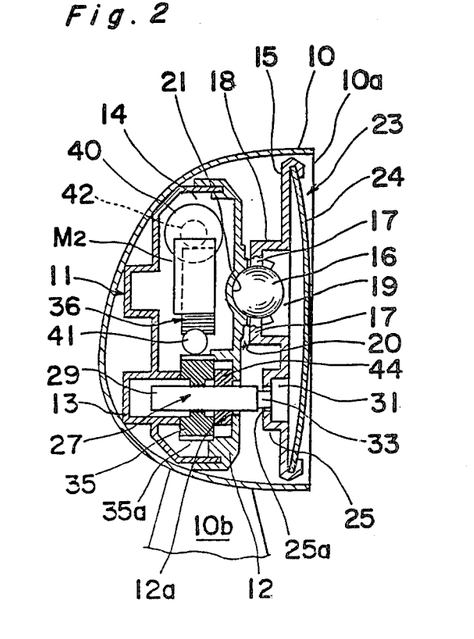
FIG. 2 is a cross sectional view taken along the line II—II in FIG. 1.
Figures 3, 5, 6:
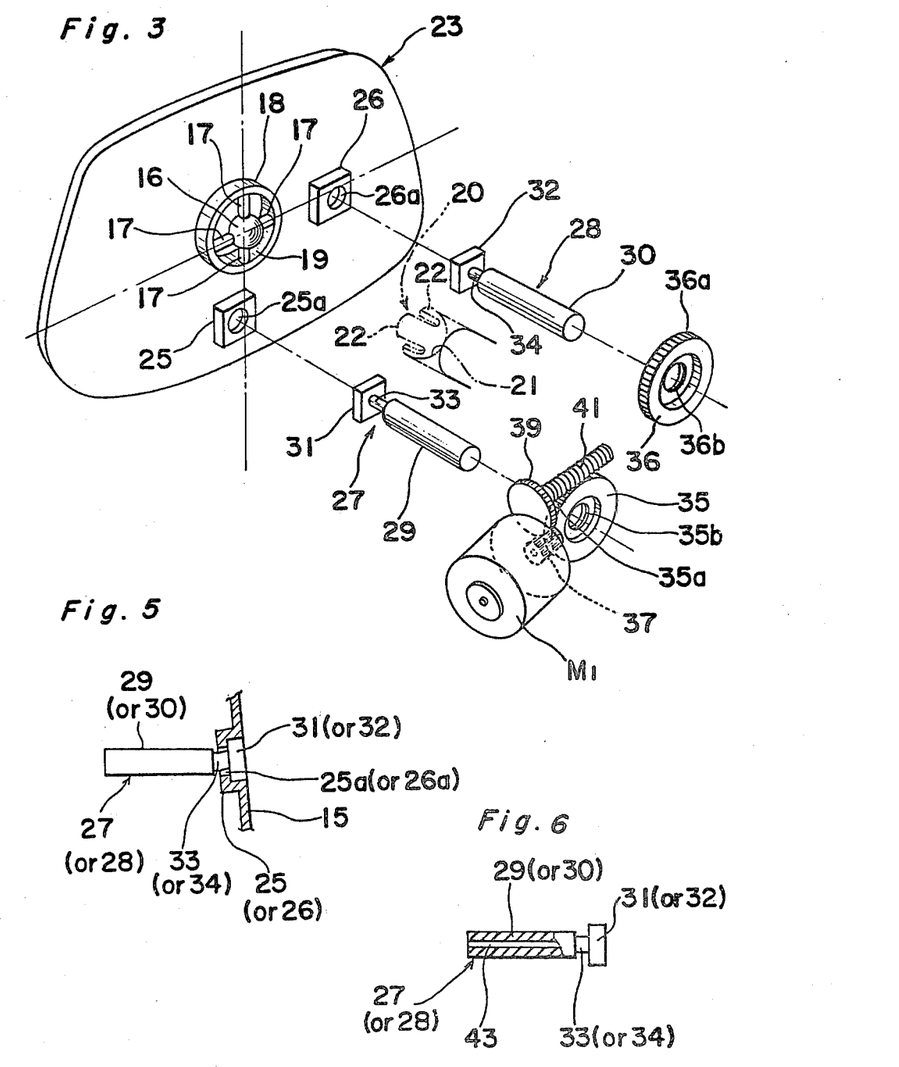
FIG. 3 is a perspective view of the mirror assembly shown in FIG. 1.
FIG. 5 is a sectional view of another portion of the mirror assembly shown in FIG. 2, showing the manner in which the respective rod member is laterally deformed incident to the adjustment of the mirror relative to the mirror box.
FIG. 6 is a view similar to FIG. 5, showing a modified form of the respective rod member.

Referring first to FIGS. 1 to 5, particularly to FIGS. 1 to 3, an electric remote control rearview mirror assembly for an automobile is shown as accommodated with a mirror box 10 of a generally bowl-like shape having an opening 10a. The mirror box 10 with the mirror assembly therein is adapted to be rigidly mounted in any known manner on, for example, the top of a front fender of an automobile body structure (not shown) through a support leg 10b with the opening 10a facing towards a driver's seat inside the automobile body structure.

The rearview mirror assembly comprises a motor casing 11 composed of a pair of casing halves 12 and 13 connected together to define a motor chamber 14, casing 11 being rigidly secured to the mirror box 10 with the casing half 13 connected to the mirror box 10 in any known manner. The rearview mirror assembly also comprises a mirror support plate 15 supported by and connected to the casing 11 through a ball and socket arrangement for universal angular pivotal movement. This ball and socket arrangement includes a ball member 16, which is rigidly supported by means of equally spaced arms 17 within a generally cylindrical bearing member 18 having one annular end rigidly secured to, or formed integrally with, the mirror support plate 15 in alignment with a central aperture defined at 19 in the support plate 15, and a socket member 20 integrally formed with the casing half 12 and constituted by a circular bearing recess 21 on a central portion of the casing half 12 and four equally spaced elastic fingers 22 which surround the bearing recess 21 and protrude outwardly of the casing 11 from the casing half 12.

With the ball and socket arrangement so constructed as hereinabove described, the mirror support plate 15 is pivotally connected to the casing 11 with the ball member 16 elastically movably received in the bearing recess 21 while the fingers 22 protrude loosely into corresponding openings between the arms 17, fingers 22 applying their own resiliencies to the ball member 16 to preload and, at the same time, retain the ball member 16 under tension within the socket member 20. In any event, the ball and socket arrangement may not be always limited to the one described and shown with particular reference to FIGS. 2 and 3, but may be of any known construction such as disclosed in the previously mentioned U.S. patent.

The mirror support plate 15 forms a mirror unit 23 together with a rearview mirror 24 having a reflective surface and a backside and supported by the mirror support plate 15 with the backside of the rearview mirror 24 facing the mirror support plate 15. This mirror support plate 15 has a pair of generally rectangular bearing recesses 25 and 26 defined therein and protruding rearwardly in a direction opposite to the rearview mirror 24, bearing recesses 25 and 26 being spaced an equal or different distance from the ball member 16 and also spaced angularly, preferably 90°, from each other about the ball member 16. Each of these rectangular bearing recesses 25 and 26 has a through-hole defined at 25a or 26a defined in a bottom wall of the corresponding recess 25 or 26, the function of which will subsequently be described.

The rearview mirror assembly also comprises a pair of rod members 27 and 28 of identical construction each comprised of an elongated stem 29 or 30 of a diameter equal to or slightly larger than the diameter of the corresponding through-hole 25a or 26a, a fixture 31 or 32 mating in shape to the corresponding rectangular bearing recess 25 or 26, and a neck portion 33 or 34 extending between the associated stem 29 or 30 and the associated fixture 31 or 32 and having a diameter smaller than that of any one of the stems 29 and 30. In an assembled condition as best shown in FIG. 2, the rod members 27 and 28 protrude from the mirror support plate 15 into the casing 11 through respective openings (only one of which is shown by 12a in FIG. 2) in the casing half 12 with the associated fixtures 31 and 32 being tightly received, or otherwise bonded, in the corresponding bearing recesses 25 and 26, the neck portions 33 and 34 of the respective rod members 27 and 28 extending loosely through the corresponding through-holes 25a and 26a in the bottom walls of the bearing recesses 25 and 26 in the mirror support plate 15.

In the embodiment described with reference to and shown in FIGS. 1 to 5, each of the rod members 27 and 28 is made of an elastic material such as natural rubber or a synthetic rubber, for example, urethane rubber or silicone rubber. Accordingly, it will readily be seen that each rod member 27 or 28 is generally capable of bending elastically, however, the neck portion 33 or 34 being more flexuous than the stem 29 or 30 because of the reduced diameter.

Figure 4:
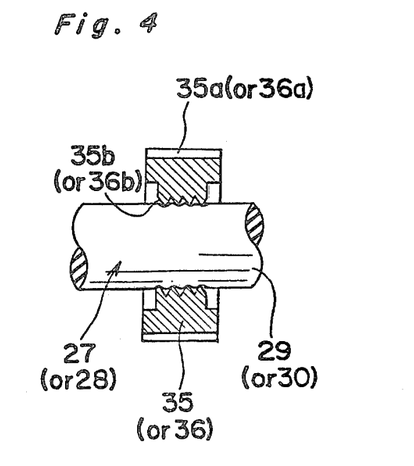
FIG. 4 is a sectional view, on an enlarged scale, of a portion of the mirror assembly shown in FIG. 2, showing the manner in which one of the rod members extends through a corresponding nut member.

Within the casing 11, the stems 29 and 30 of the rod member 27 and 28 extend through respective nut members 35 and 36 which are supported between the casing halves 12 and 13 against any axial displacement along the associated stems 29 and 30 of the respective rod members 27 and 28. These nut members 35 and 36, being made of a rigid material such as a hard synthetic resin or a metal, have, as best shown in FIG. 4, their outer peripheral faces formed with respective gear teeth 35a and 36a and also have their inner peripheral faces formed with respective threads 35b and 36b. It is to be noted that, because of the employment of the elastic and rigid materials respectively for the rod members 27 and 28 and the nut members 35 and 36, not only can the stems 29 and 30 of the respective rod members 27 and 28 be inserted through the associated nut members 35 and 36 by pushing the rod members 27 and 28 in a direction axially thereof, but also the associated nut members 35 and 36 are, once the respective rod members 27 and 28 have been set in position relative to the associated nut members 35 and 36, drivingly coupled to the stems 29 and 30 with the internal threads 35b and 36b elastically and threadingly engaged on the peripheral surfaces of the respective stems 29 and 30 as best shown in FIG. 4.

More specifically, as each of the stems 29 and 30 of the respective rod members 27 and 28 is inserted through the corresponding nut member 35 or 36, the stem 29 or 30 is radially inwardly compressed in succession in contact with the internal threads 35b or 36b of the corresponding nut member 35 or 36 because of the employment of the elastic and rigid materials as hereinbefore described. However, once the rod member 27 or 28 has been set in position relative to the corresponding nut member 35 or 36, the internal threads 35b or 36b of the corresponding nut member 35 or 36 encroach upon the associated stem 29 or 30 against the resiliency of such associated stem 29 or 30 then tending to restore to the original position and, accordingly, the corresponding nut member 35 or 36 is threadingly mounted and engaged on the associated stem 29 or 30.

In view of the above, it is clear that rotation of the nut members 35 and 36 which is effected in a manner as will subsequently be described results in an axial movement of the rod members 27 and 28 in a manner as if the internal threads 35b and 36b of the respective nut members 35 and 36 were to form mating threads on the associated peripheral surfaces of the respective stems 29 and 30 as the rod members 27 and 28 move axially relative to the nut members 35 and 36. This feature results in that the insertion of the stems 29 and 30 through the internally threaded nut members 35 and 36 is free from generation of noises and permits a ready and quick manual adjustment of the position, or angularity, of the mirror unit 23 relative to the mirror box 10 only by applying an external pushing force to the individual rod members 27 and 28 through the mirror unit 23 as will be discussed in more detail later.

As best shown in FIGS. 1 and 3, the rearview mirror assembly further comprises electric reversible motors M1 and M2 for driving the nut members 35 and 36, respectively. Each of these motors M1 and M2 has a pinion gear 37 or 38 rigidly mounted on the drive shaft thereof, pinion gear 37 or 38 being meshed to a respective gear 39 or 40 which is rigidly mounted on, or integrally formed with, an elongated worm gear 41 or 42. These worm gears 41 and 42 are rotatably supported inside the casing 11 with their substantially intermediate portions drivingly engaged to the external gear teeth 35a and 36a of the respective nut members 35 and 36.

The motors M1 and M2 may be adapted to be brought into operation either one at a time or simultaneously with each other depending on the design of an electric circuit system for the motors M1 and M2, it being, however, understood that the electric circuit system does not constitute a portion of the subject matter of the present invention and may, therefore, be of any known construction.

While the remote control rearview mirror assembly according to the first preferred embodiment of the present invention is constructed as hereinbefore described, it will readily be seen that rotation of one of the motors M1 results in upward and downward tilting of the mirror unit 23 around the horizontal axis depending upon the direction of rotation of the motor M1 and rotation of the other of the motors M2 results in leftward and rightward swinging of the mirror unit 23 around the vertical axis depending on the direction of rotation of the motor M2. This is possible because rotation of each of the nut members 35 and 36 driven by the respective motors M1 and M2 in the manner described above is converted into axial movement of the corresponding rod member 27 or 28 in the manner as hereinbefore described and in such a manner as if a bolt is threaded through a nut. However, because of the employment of the elastic material for each of the rod members 27 and 28, not only can a portion of the peripheral surface of the respective rod member 27 or 28 on which the trace of the internal threads 35b or 36b of the corresponding nut member 35 or 36 has been formed be restored to the original shape, that is, a smooth peripheral surface portion, but also the neck portion 33 or 34 of the respective rod member 27 or 28 is, as best shown in FIG. 5, deformed laterally with respect to the longitudinal axis of such respective rod member 27 or 28 to permit the mirror unit 23 to tilt and/or swing around the horizontal and vertical axes.

Because of the higher flexibility of the neck portion 33 or 34 of each of the rod members 27 and 28 than that of the stem 29 or 30 thereof, substantially no built-up stress occurs in the respective rod member 27 or 28 even though the neck portion 33 or 34 deforms laterally to permit the mirror unit 23 to tilt and/or swing as hereinbefore described.

In addition, if it is desired to adjust the angle of the mirror unit relative to the casing 11 or the plane of opening 10a of the mirror box 10 after the rearview mirror assembly has been assembled, but prior to placement into a package for shipment, this adjustment can readily be carried out only by applying an external pushing force to portions of the mirror unit 23 which are aligned with the rod members 27 and 28. During this adjustment, no electric power supply to the motors M1 and M2 is required and, instead, the stems 29 and 30 are permitted to axially move relative to the respective nut members 35 and 36 without being rotated. This is possible because of the employment of the elastic material for the rod members 27 and 28.

However, there may be the possibility that, if the elastic material for the rod members 27 and 28 lacks sufficient hardness, the external pushing force will not be transmitted to the stems 29 and 30 of the respective rod members 27 and 29. In order to avoid this possibility, where the elastic material for the rod members 27 and 28 has a hardness not more than 90°, a metallic wire member such as shown by 43 in FIG. 6 may be inserted into the stem 29 or 30 of each of the rod members 27 and 28.

Also, there may be the possibility that if the elastic material for the rod members 27 and 28 has sufficient hardness for transmitting the rotation of the nut members 35 and 36 of the rigid material to the axial movement of the rod members 27 and 28 through an engagement between the internal gear teeth 35b and 36b of the nut members 35 and 36 and external threads provided on the elongated stem 29 or 30 of the rod members 27 and 28, the rod members 27 and 28 may be formed with the elongated stem 29 and 30 as hollow cylindrical members or bars having holes 29b (or 30b) along the center axes thereof for facilitating the deformation of the rod members 27 and 28 to disengage from the nut members 35 and 36 on the application of an excess external pushing force to the rod members 27 and 28 through the mirror unit 23, as shown in FIGS. 15 to 19. With reference to FIGS. 15 to 19, the nut members 35 and 36 are made of the rigid material such as metal or hard synthetic material provided with the internal gear teeth or threads 35b and 36b, while the rod members 27 and 28 are made of the elastic material such as urethane rubber, elastic fiber, or soft resin, plastics material. The stems 29 and 30 are provided with convex portions defining external threads 29a (or 30a) having a rounded shape and with concave portions defined by cut-out grooves or portions 29c (or 30c) having flat bottoms. The holes 29b (or 30b) of the elongated stem 29 or 30 having the same length as the external threads 29a (or 30a) and cut-out grooves 29c (or 30c).

Figure 18A:
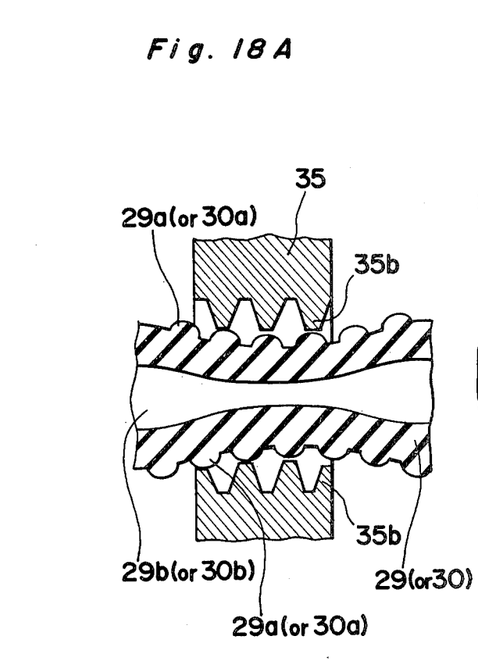
FIGS. 18A and 18B are schematic views similar to FIGS. 17A and 17B for the purpose of explanation of releasing the rod member from the nut member.
Figure 18B:
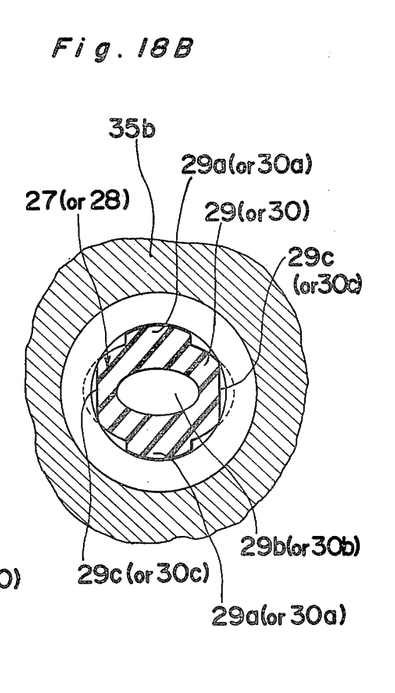
Figure 19:
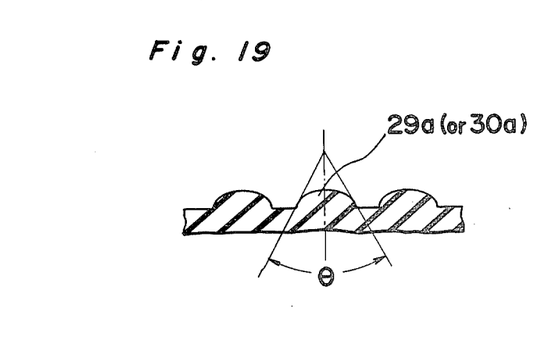
FIG. 19 is a schematic view, on an enlarged scale, of the thread portion of the rod member shown in FIG. 15.

The external threads 29a (or 30a) of the rod members 27 and 28 are formed along the axial direction of the rod members and are defined by surfaces with configurations having a semicircular shape, projected within a certain angle $\theta$, viewed in axial-section, as shown in FIG. 19, and by a pair of arc-segment projections with a certain width B, viewed in transverse cross-section, as shown in FIG. 17B, thereby forming circular outer threads provided intermittently on the outer surfaces of the rod members 27 and 28 to be meshed with the inner gear teeth 35b or 36b of nut members 35 and 36, as shown in FIG. 17A. A pair of the cut-out grooves 29c (or 30c) of the elongated stem 29 and 30 are provided on the remaining portions of the outer surface of the rod members 27 and 28, and with which the external threads 29a (or 30a) do not mesh. This enables greater deformation of the rod members 27 and 28 within the inner gear teeth 35b (or 36b) of nut members 35 and 36 in directions normal to the external threads 29a (or 30a) upon the application of an external pushing force to the rod members 27 and 28 through the mirror unit 23, as shown in FIGS. 18A and 18B, whereby the deformed rod members 27 and 28 can freely move through the internal gear teeth 35b and 36b of the nut members 35 and 36 in accordance with the position of the mirror unit 23.

With the above arrangement of rod members and nut members, it is to be noted that the smaller are the inner diameters of holes 29b (or 30b) of the cylindrical rod members 27 and 28, the larger will be the transmitting force of the nut members 35 and 36 to the rod members 27 and 28. Also, the larger are the outer diameter, width and/or elastic efficiency of the external threads 29a (or 30a) of the rod members 27 and 28, the larger will be the transmitting force of the nut members 35 and 36 to the rod members 27 and 28. In addition, with the employment of the rubber rod members 27 and 28, it is possible to have good damping properties of the engagement of the rod members 27 and 28 and the nut members 35 and 36, thereby absorbing vibrations at high frequency.

Furthermore, as best shown in FIG. 2, in order to prevent foreign matter, such as dust and/or water, from entering into the casing 11 through bearing apertures in the casing half 12 through which the respective stems 29 and 30 extend, an elastic sealing ring 44 may be employed for each bearing aperture in the casing half 12. The elastic sealing ring 44 is preferably made of felt or a foamed synthetic resin and is in the form of a disc shape having a central opening of a diameter slightly smaller than the diameter of the corresponding stem 29 or 30. This elastic sealing ring 44 is mounted on the corresponding stem 29 or 30 of the respective rod member 27 or 28 and positioned under compression between the casing half 12 and the corresponding nut member 35 or 36.

It is to be noted that the employment of the sealing rings 44 substantially obviates the need for employment of a relatively expensive and hard-to-install bellow type seal such as is required in prior art rearview mirror assemblies of this type.

In the embodiment described with reference to and shown in FIGS. 1 to 5, the rod members 27 and 28 have been described as made of the elastic material. However, it is also possible to make the rod members of the rigid material and the nut members of the elastic material. This will now be described with reference to FIGS. 7 to 11.

Figure 7:
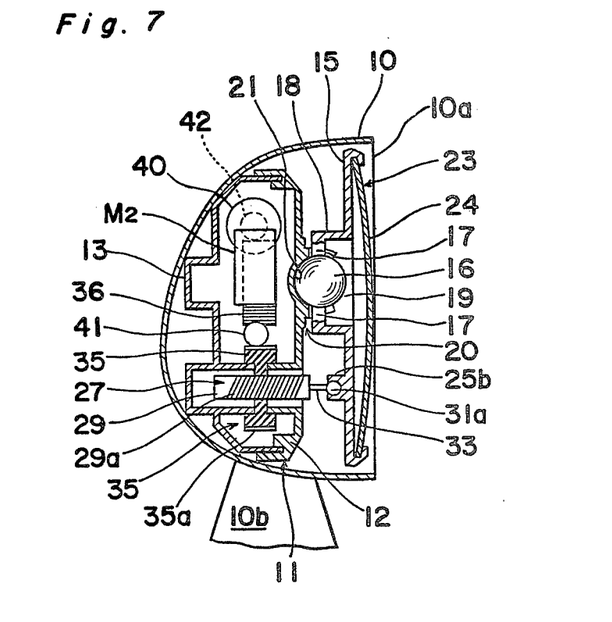
FIG. 7 is a view similar to FIG. 2, showing the mirror assembly according to another preferred embodiment of the present invention.
Figure 10:
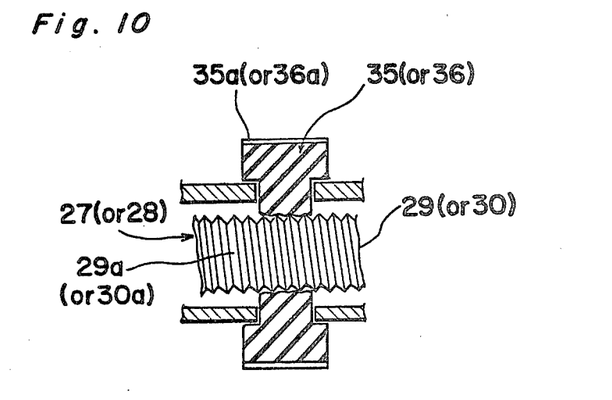
FIGS. 10 and 11 are longitudinal sectional views, on an enlarged scale, showing normal and tilted states of the respective rod member relative to the corresponding nut member employed in the mirror assembly shown in FIG. 7.
Figure 11:
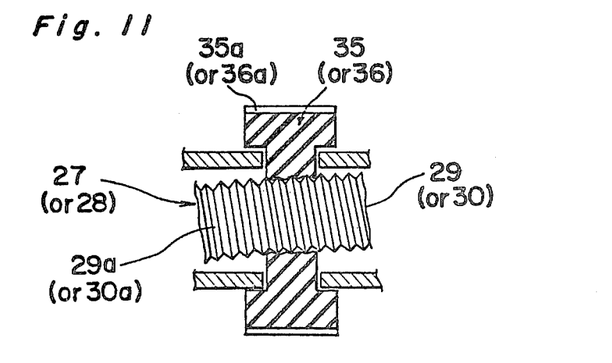

Referring particularly to FIGS. 7, 10 and 11, each of the rod members 27 and 28 is made of the rigid material and has respective threads 29a or 30a defined on the peripheral surface of the corresponding stem 29 or 30. The rod members 27 and 28 have respective balls (only one of which is shown by 31a in FIG. 7 as associated with the rod member 27) instead of the respective rectangular block-shaped fixtures 31 and 32. Each of the rod members 27 and 28 is pivotally connected to the mirror support plate 15 with the corresponding ball elastically tightly, but movably, received in a corresponding socket, defined in the mirror support plate 15, in a manner similar to the ball and socket arrangement used to connect pivotally the mirror unit 23 to the casing 11. It is to be noted that only one of the sockets in the mirror support plate 15 which pivotally receives the ball 31a of the rod member 27 is shown by 25b in FIG. 7.

On the other hand, each of the nut members 35 and 36 is made of the elastic material and has a smooth inner peripheral surface instead of being provided with the corresponding internal threads such as shown by 35b or 36b in FIG. 4.

Even in the embodiment shown in FIGS. 7, 10 and 11, when any one of the nut members 35 and 36 is rotated by the corresponding motor M1 or M2, the inner peripheral surface of the respective nut member 35 or 36 is formed with a trace of the threads 29a or 30a on the corresponding stem 29 or 30 while permitting the latter to move in a direction axially thereof as best shown in FIG. 10. However, when the mirror unit 23 is displaced from a predetermined angularity relative to the casing 11 or the mirror box 10, the mirror unit 23 pivots about any one of the balls of the respective rod members 27 and 28 and, at the same time, one or both of the threaded stems 29 and 30 are inclined relative to the associated nut members 35 and 36 against the resiliency of the nut members 35 and 36 as best shown in FIG. 11. In view of this, the rod members 27 and 28 used in the rearview mirror assembly according to the embodiment shown in FIGS. 7, 10 and 11 are substantially free from any possible built-up stress which would occur unless the inclination of these stems 29 and 30 is absorbed by the resiliency of the corresponding nut members 35 and 36.

Moreover, because of the nut members 35 and 36 being made of the elastic material, the manual adjustment of the angularity of the mirror unit 23 relative to the casing 11 or the mirror box 10 can readily be carried out by applying an external pushing force, in a manner substantially similar to that in the foregoing embodiment of FIGS. 1 to 5.

It is to be noted that, since each of the nut members 35 and 36 in the embodiment of FIGS. 7, 10 and 11 has not internal threads such as required in the nut members used in the foregoing embodiment, the nut members 35 and 36 used in this embodiment of FIGS. 7, 10 and 11 can readily be manufactured at reduced cost and without requiring any complicated procedure as compared with that used in the foregoing embodiment of FIGS. 1 to 5. However, the embodiment of FIGS. 1 to 5 has its own advantage in that, since the rod members 27 and 28 are made of the elastic material, the required connection between the rod members 27 and 28 and the mirror support plate 15 can readily be achieved as compared with the employment of the ball and socket arrangement in the embodiment of FIGS. 7, 10 and 11.

Figure 8:
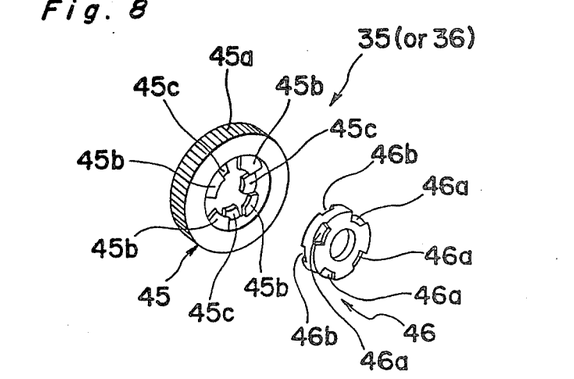
FIG. 8 is a perspective view, on an enlarged scale, showing a modified form of the respective nut member.
Figure 9:
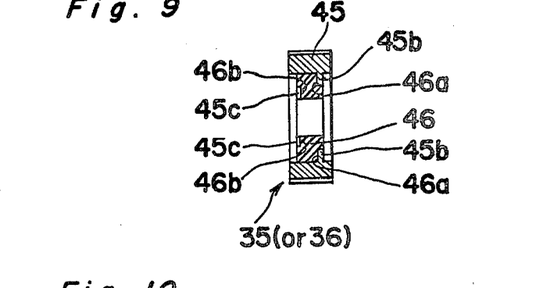
FIG. 9 is a longitudinal sectional view of the modified nut member shown in FIG. 8.

It is also to be noted that, so far as the embodiment of FIGS. 7, 10 and 11 is concerned, there is the possibility that the external gear teeth 35a and 36a of the respective nut members 35 and 36 tend to readily wear out in contact with the rigid threads on the associated worm gears 41 and 42 (FIGS. 1 and 7). This is particularly true where the mirror angularity adjustment is frequently carried out by supplying electric power to the motors M1 and M2. This possibility can advantageously be eliminated by constructing each of the nut members 35 and 36 in a manner as will now be described with reference to and shown in FIGS. 8 and 9. In FIGS. 8 and 9, however, only one of the nut members, for example, the nut member 35, is shown for the sake of brevity and, therefore, it is to be understood that the same description to be made with reference to FIGS. 8 and 9 applies to the other nut member 36.

Referring to FIGS. 8 and 9, the nut member 35 useable in the rearview mirror assembly according to the embodiment of FIGS. 7, 10 and 11 comprises an externally geared outer ring member 45 made of a rigid material such as a metal or a hard synthetic material and an inner ring member 46 made of the elastic material and tightly fitted into the outer ring member 45 in coaxial relation thereto. As best shown in FIG. 8, the outer ring member 45 has an outer peripheral face formed into gear teeth 45a engageable with the corresponding worm gear 41, and two circular, axially spaced rows of clamping fins protruding radially inwardly from the inner peripheral face of outer ring member 45, the fins in one circular row adjacent one end of outer ring member 45 and the fins in the other circular row adjacent the other end of the same outer ring member 45 being generally identified by 45b and 45c, respectively.

The clamping fins 45b and 45c in each row are equally spaced from each other and the clamping fins 45b and 45c in the two rows are arranged in offset relation with respect to the longitudinal extent of the outer ring member 45.

On the other hand, the inner ring member 46 has an outer diameter equal to or slightly larger than the inner diameter of the outer ring member 45 and has two pairs of recesses defined respectively at 46a and 46b in the inner ring member 46, each of recesses 46a and 46b having a shape complementary to the shape of any one of the clamping fins 45b and 45c. It is to be noted that the number of the recesses 46a and 46b in each pair is equal to that of the clamping fins 45b or 45c in the corresponding row.

The insertion of the inner ring member 46 into the opening of the outer ring member 45 can readily be carried out by forcibly deforming the inner ring member 46 as it is fitted into the outer ring member 45 and then allowing the pairs of the recesses 46a and 46b to receive the respective rows of the clamping fins 45b and 45c, as shown in FIG. 9, as the once-deformed inner member 46 restores to the original shape by the effect of its own resiliency.

Figure 12:
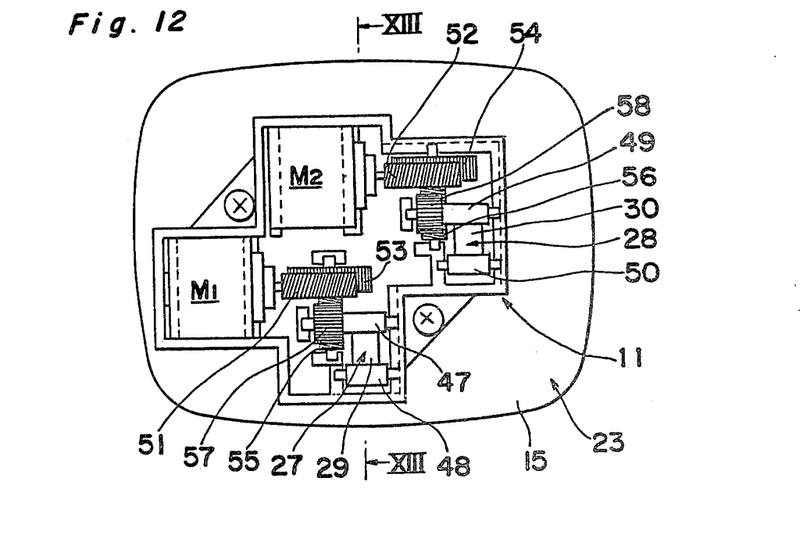
FIG. 12 is a view similar to FIG. 1, showing the mirror assembly according to a further preferred embodiment of the present invention.
Figure 13:
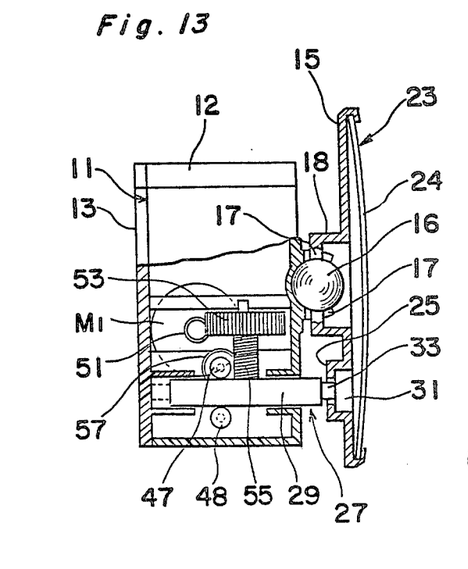
FIG. 13 is a cross sectional view taken along the line XIII—XIII in FIG. 12.
Figure 14:
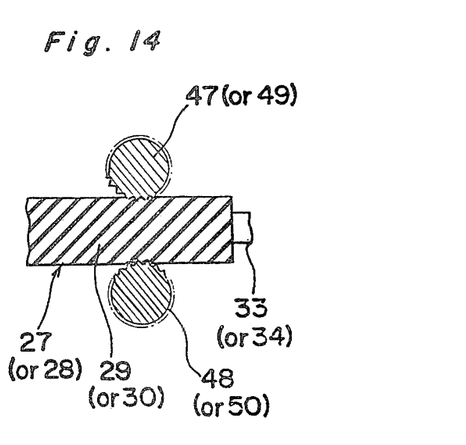
FIG. 14 is a longitudinal sectional view, on an enlarged scale, of a portion of the mirror assembly shown in FIG. 13.
Figure 15:
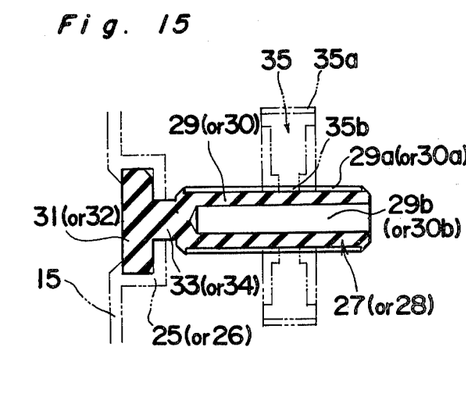
FIG. 15 is a view similar to FIG. 5, on an enlarged scale, showing another modified form of the respective rod member.
Figure 16:
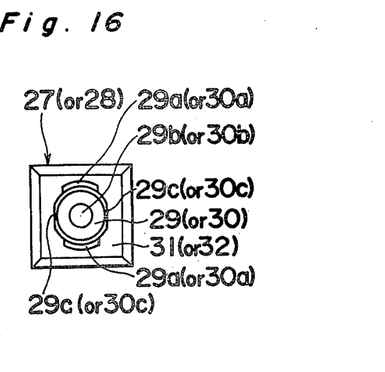
FIG. 16 is a right elevational side view of the rod member shown in FIG. 15.
Figure 17:
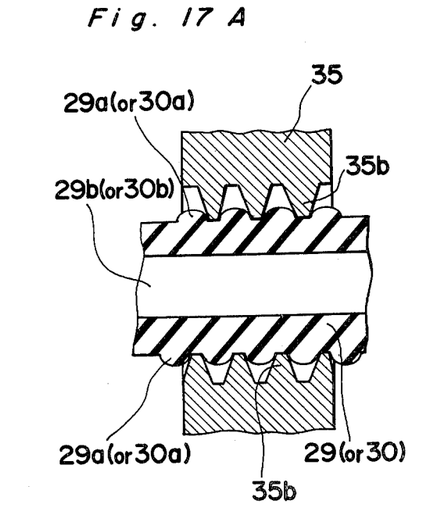
FIGS. 17A and 17B are schematic views for the purpose of explanation of meshing the rod member shown in FIG. 15 with the nut member.

In the embodiment shown in FIGS. 12 to 14, a pair of pinch rollers are employed instead of each of the nut members 35 and 36. The pinch rollers operatively associated with the rod member 27 are identified by 47 and 48 and the pinch rollers operatively associated with the rod member 28 are identified by 49 and 50. The pinch rollers 47 and 49 serve as drive rollers and are operatively coupled to the respective motors M1 and M2 through corresponding transmission systems as will be described later, whereas the pinch rollers 48 and 50 serve as idler rollers.

Each pair of the pinch rollers 47 and 48 or 49 and 50 are rotatably supported in any known manner inside the casing 11 and spaced a distance sufficient to drivingly clamp the corresponding stem 29 or 30 of the respective rod member 27 or 28 so that rotation of the drive roller 47 or 49 can result in axial movement of the respective rod member 27 or 28. It is to be noted that, in the embodiment shown in FIGS. 12 to 14, the pinch rollers 47 to 50 are made of the rigid material whereas the rod members 27 and 28 are made of the elastic material and are of identical construction with that employed in the first embodiment of FIGS. 1 to 5. In addition, at least the drive rollers 47 and 49, preferably all of the pinch rollers 47 to 50, have their respective peripheral surfaces formed with regular or irregularly distributed indents effective to avoid any possible slip of the pinch rollers relative to the associated stems 29 and 30 of the respective rod members 27 and 28.

Each of the drive transmission systems for transmitting respective drives from the motors M1 and M2 to the drive rollers 47 and 49 comprises a worm gear 51 or 52 rigidly mounted on the drive shaft of the associated motor M1 or M2, a gear wheel 53 or 54 meshed to the worm gear 51 or 52, a worm gear 55 or 56 integrally formed with, or otherwise rigidly connected to, the gear wheel 53 or 54 in coaxial relation thereto, and a pinion gear 57 or 58 meshed to the worm gear 55 or 56 and rigidly connected to, or otherwise integrally formed with the drive roller 47 or 49 in coaxial relation thereto, respectively.

Each of the stems 29 and 30 of the respective rod members 27 and 28 employed in the embodiment shown in FIGS. 12 to 14 is preferably of a generally rectangular cross section as best shown in FIG. 12, although it may be of a circular cross section as shown in FIGS. 1 and 3. The rearview mirror assembly according to the embodiment shown in FIGS. 12 to 14 functions in a substantially similar manner as that according to the embodiment shown in FIGS. 1 to 5.

Although the present invention has fully been described in connection with the preferred embodiments with reference to the accompanying drawings, it is to be noted that various changes and modifications will be apparent to those skilled in the art. By way of example, the rod members 27 and 28 in the embodiment shown in FIGS. 1 to 5 may have threads defined on the respective peripheral surfaces of the stems 29 and 30 in mating relation to the internal threads 35b and 36b of the associated nut members 35 and 36. In this case, since the threads on the peripheral surfaces of the stems 29 and 30 of the rod members 27 and 28 in the embodiment of FIGS. 1 to 5 are pliable because of the employment of the elastic material for the rod members 27 and 28, the manual adjustment of the mirror angularity can readily be carried out. Similarly, the nut members 35 and 36 in the embodiment shown in FIGS. 7, 10 and 11 may have respective internal threads in mating relation to the threads 29a and 30a on the stems 29 and 30 of the corresponding rod members 27 and 28.

Moreover, in each of the embodiments shown in FIGS. 1 to 5 and FIGS. 12 to 14, the rod members 27 and 28 may be of one-piece construction connected together by means of a bridge having its opposite ends integral with the fixtures 31 and 32, in which case in the assembled condition of the rearview mirror assembly the bridge is positioned on one side of the mirror support plate 15 adjacent the mirror 24.

Except for the rod members 27 and 28 and the nut members 35 and 36, the type of material for which is an essential feature of the present invention, the other component parts of the rearview mirror assembly embodying the present invention may be made of either a metal or a hard synthetic resin.

Furthermore, the concept of the present invention can equally be applicable to a rearview mirror assembly wherein one electric reversible motor, instead of two motors M1 and M2, is employed in combination with a solenoid unit such as disclosed in the previously mentioned U.S. patent.

Accordingly, such changes and modifications are to be understood as included within the true scope of the present invention unless they depart therefrom.

We claim:

1. In an electric remote control rearview mirror assembly comprising, in combination, a mirror unit including a mirror support plate and a mirror having a reflective surface and a backside and supported by said mirror support plate with said backside facing thereto, a support casing positioned on one side of said mirror support plate remote from said mirror, a spherical mounting member positioned between said mirror unit and said support casing for clamping said mirror support plate thereon for pivotal movement around horizontal and vertical axes, a pair of sockets defined in said mirror support plate in spaced relation to said spherical mounting member and spaced a predetermined angle from each other with respect to said spherical mounting member, a pair of rod members pivotally secured first ends thereof in respective said sockets against rotational and axial displacement relative to said mirror support plate, said rod members protruding from said mirror support plate into said support casing, a pair of drive members rotatably supported inside said support casing and held in driving engagement with respective end portions of said rod members inside said support casing, and electric drive means housed inside said support casing for selectively rotating said drive members to pivotally adjust said mirror unit about said spherical mounting member to adjust the angularity of said mirror unit with respect to the horizontal and vertical axes, the improvement wherein:

each said rod member is made of an elastic material and includes an elongated stem in the form of a hollow cylindrical member; and each said drive member is made of a rigid material and includes means for engaging said stem of a respective said rod member, while enabling said rod member to easily deform to disengage from said drive member upon the application of a large force axially to said rod member.

2. A mirror assembly as claimed in claim 1, wherein each said rod member is provided with partial threads on the outer surface of the respective said elongated stem, and each said drive member is provided with internal threads meshing with said partial threads of said rod member.

3. A mirror assembly as claimed in claim 2, wherein each said rod member includes a neck portion providing a flexural region effective to accommodate any possible inclination of said mirror unit relative to said rod member.

4. A mirror assembly as claimed in claim 3, wherein said neck portion of each said rod member is formed of a reduced diameter smaller than the diameter of the respective said elongated stem so as to form said flexural region.

5. A mirror assembly as claimed in claim 2, wherein said threads on each said stem of each said rod member comprises partial threads extending around only a portion of the periphery of said stem.

6. A mirror assembly as claimed in claim 5, wherein said partial threads of each said rod member are interrupted by at least one longitudinal cut away portion on said periphery.

7. A mirror assembly as claimed in claim 6, wherein said cut-away portion is defined by a longitudinally extending flat surface.

8. A mirror assembly as claimed in claim 7, comprising two said flat surfaces at opposite diametrical positions on said periphery, with two longitudinally extending arrangements of said partial threads separated by said flat surfaces.

9. A mirror assembly as claimed in claim 1, wherein said support casing has bearing apertures defined therein, said rod members extending from said mirror support plate into said support casing through respective said bearing apertures, and further comprising an elastic sealing ring interposed between said support casing and one of said drive members in alignment with the corresponding said bearing aperture and also in alignment with the corresponding said rod member.

10. A mirror assembly as claimed in claim 1, wherein said rod members are made of rubber materials.

* * * * *